United States Patent [19]
Kreitzer

[11] Patent Number: 5,900,987
[45] Date of Patent: May 4, 1999

[54] ZOOM PROJECTION LENSES FOR USE WITH PIXELIZED PANELS

[75] Inventor: Melvyn H. Kreitzer, Cincinnati, Ohio

[73] Assignee: U.S. Precision Lens Inc, Cincinnati, Ohio

[21] Appl. No.: 09/022,700

[22] Filed: Feb. 12, 1998

Related U.S. Application Data

[60] Provisional application No. 60/038,374, Feb. 13, 1997.

[51] Int. Cl.$^6$ .................................................... G02B 15/14
[52] U.S. Cl. ............................ 359/649; 359/689; 359/691
[58] Field of Search ................................. 359/649, 650, 359/651, 689, 691

[56] References Cited

U.S. PATENT DOCUMENTS

| | | |
|---|---|---|
| 4,189,211 | 2/1980 | Taylor . |
| 4,425,028 | 1/1984 | Gagnon et al. . |
| 4,461,542 | 7/1984 | Gagnon . |
| 4,826,311 | 5/1989 | Ledebuhr . |
| 5,042,929 | 8/1991 | Tanaka et al. . |
| 5,179,473 | 1/1993 | Yano et al. . |
| 5,200,861 | 4/1993 | Moskovich . |
| 5,218,480 | 6/1993 | Moskovich . |
| 5,278,698 | 1/1994 | Iizuka et al. . |
| 5,313,330 | 5/1994 | Betensky . |
| 5,331,462 | 7/1994 | Yano . |
| 5,625,495 | 4/1997 | Moskovich . |

FOREIGN PATENT DOCUMENTS

| | | |
|---|---|---|
| 311116 | 4/1989 | European Pat. Off. . |
| 0809407 | 11/1997 | European Pat. Off. . |
| WO 97/41461 | 11/1997 | WIPO . |

OTHER PUBLICATIONS

*The Handbook of Plastic Optics*, U.S. Precision Lens, Inc., Cincinnati, Ohio, 1983, pp. 17–29.

Primary Examiner—Scott J. Sugarman
Attorney, Agent, or Firm—Maurice M. Klee

[57] ABSTRACT

A zoom projection lens for use with LCD or DMD panels is provided. The lens has two units U1 and U2, which are moved relative to one another for zooming. The first unit has a negative power and includes at least three lens elements L1, L2, and L3, where L1 is composed of plastic and has two aspherical surfaces, L2 has a positive power and is composed of a flint material, and L3 has a negative power and is composed of a crown material. The second unit has two subunits $U2_{S1}$ and $U2_{S2}$, each of which has a positive power, with the power of $U2_{S2}$ being greater than the power of $U2_{S1}$. At its minimum effective focal length $f_{min}$, the projection lens has a back focal length to focal length ratio greater than one, the ratio being achieved by arranging the first unit, the second unit, and the subunits of the second unit so that:

$$D_{12}/f_{min} > 1.0,$$

$$D_{S1S2}/f_{min} > 1.0,$$

and $$D_{12}/D_{S1S2} > 1.0,$$

where $D_{12}$ is the axial distance between the first and second lens units evaluated at $f_{min}$ and $D_{S1S2}$ is the axial distance between the first and second subunits of the second lens unit.

9 Claims, 5 Drawing Sheets

ZOOM PROJECTION LENSES FOR USE WITH PIXELIZED PANELS

CROSS REFERENCE TO RELATED PROVISIONAL APPLICATION

This application claims the benefit under 35 USC §119(e) of U.S. Provisional Application No. 60/038,374, filed Feb. 13, 1997, which is hereby incorporated by reference.

FIELD OF THE INVENTION

This invention relates to projection lenses and, in particular, to zoom projection lenses which can be used, inter alia, to form an image of an object composed of pixels, such as, a liquid crystal display (LCD) or digital mirror device (DMD).

BACKGROUND OF THE INVENTION

Figure 1:
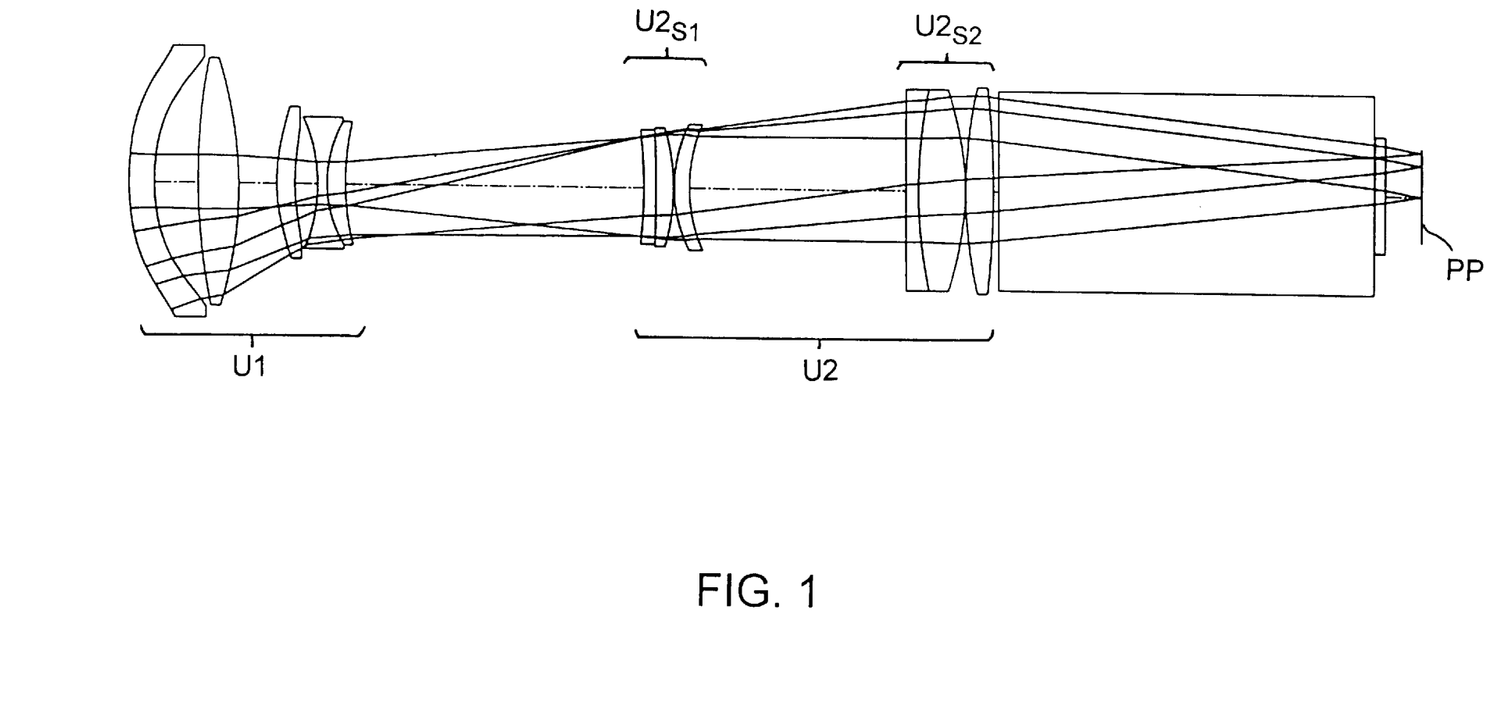
FIGS. 1–4 are schematic side views of projection lenses constructed in accordance with the invention. The pixelized panel with which the lenses are used is shown by the designation "PP" in these figures.
Figure 2:
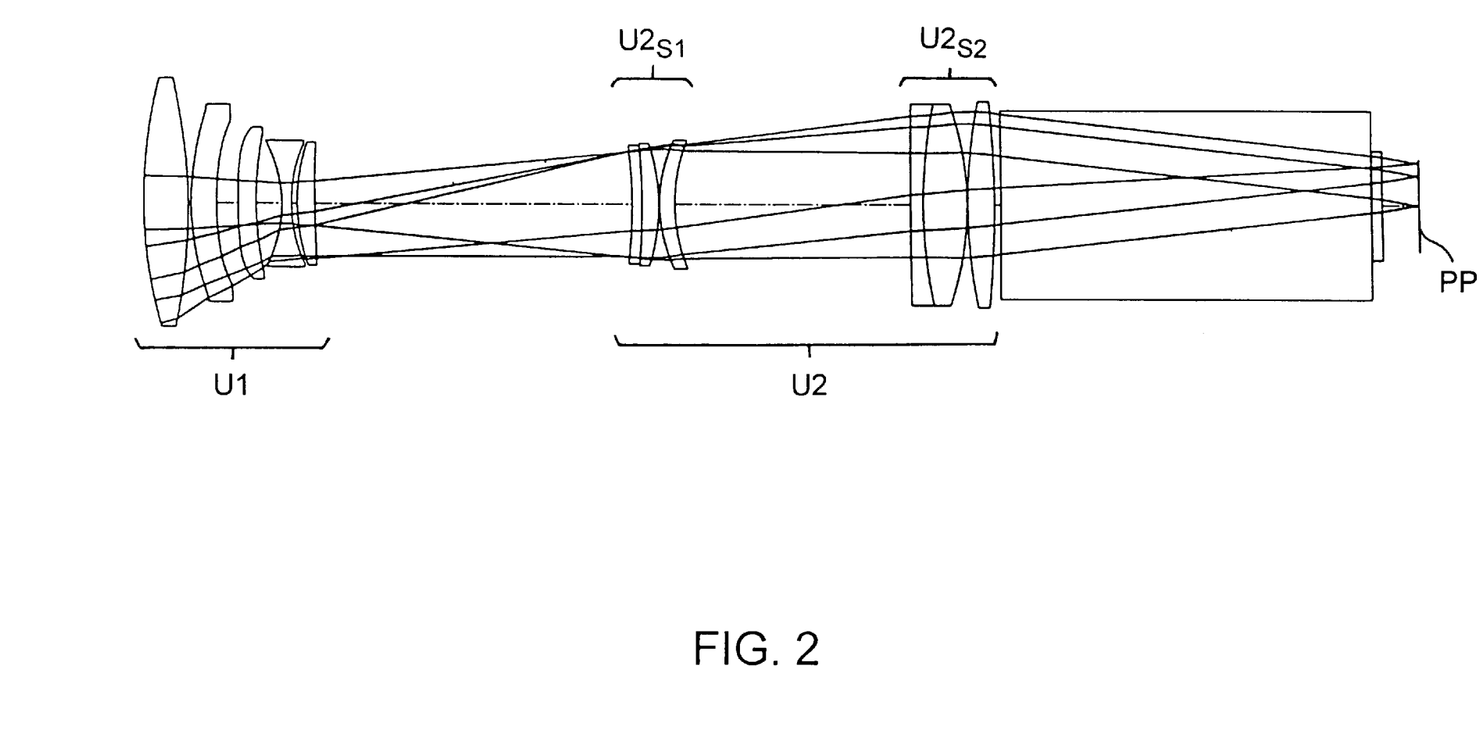
Figure 3:
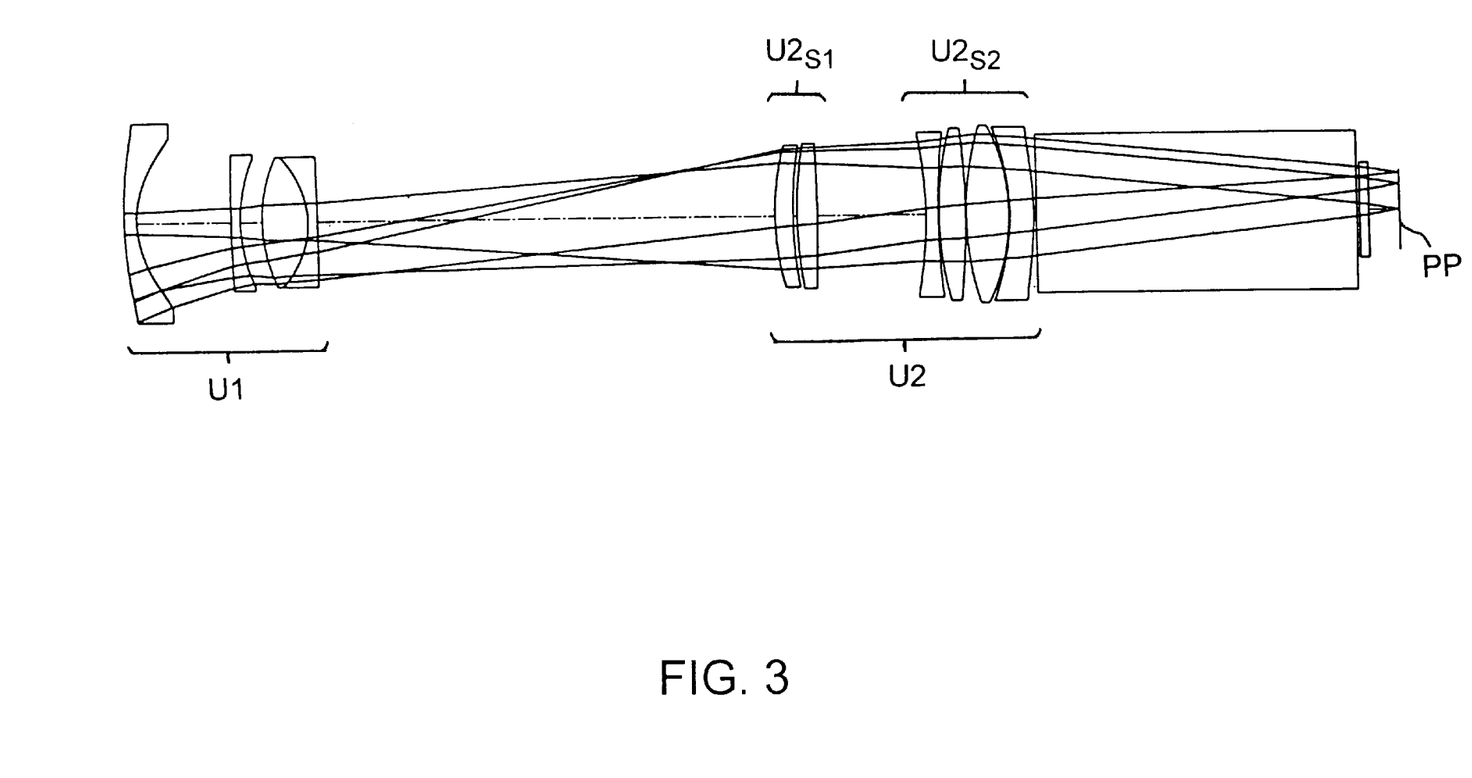
Figure 4:
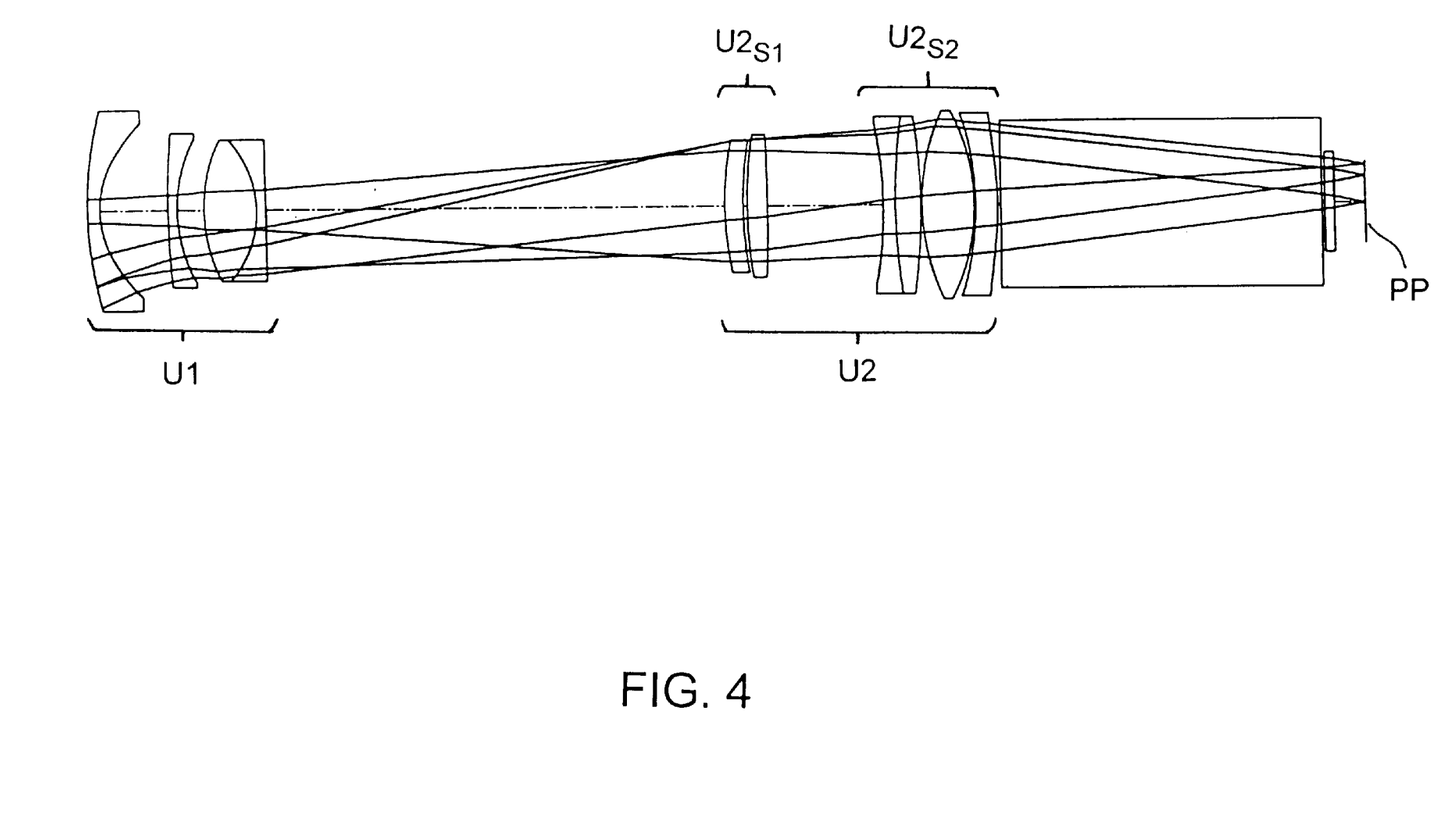
Figure 5:
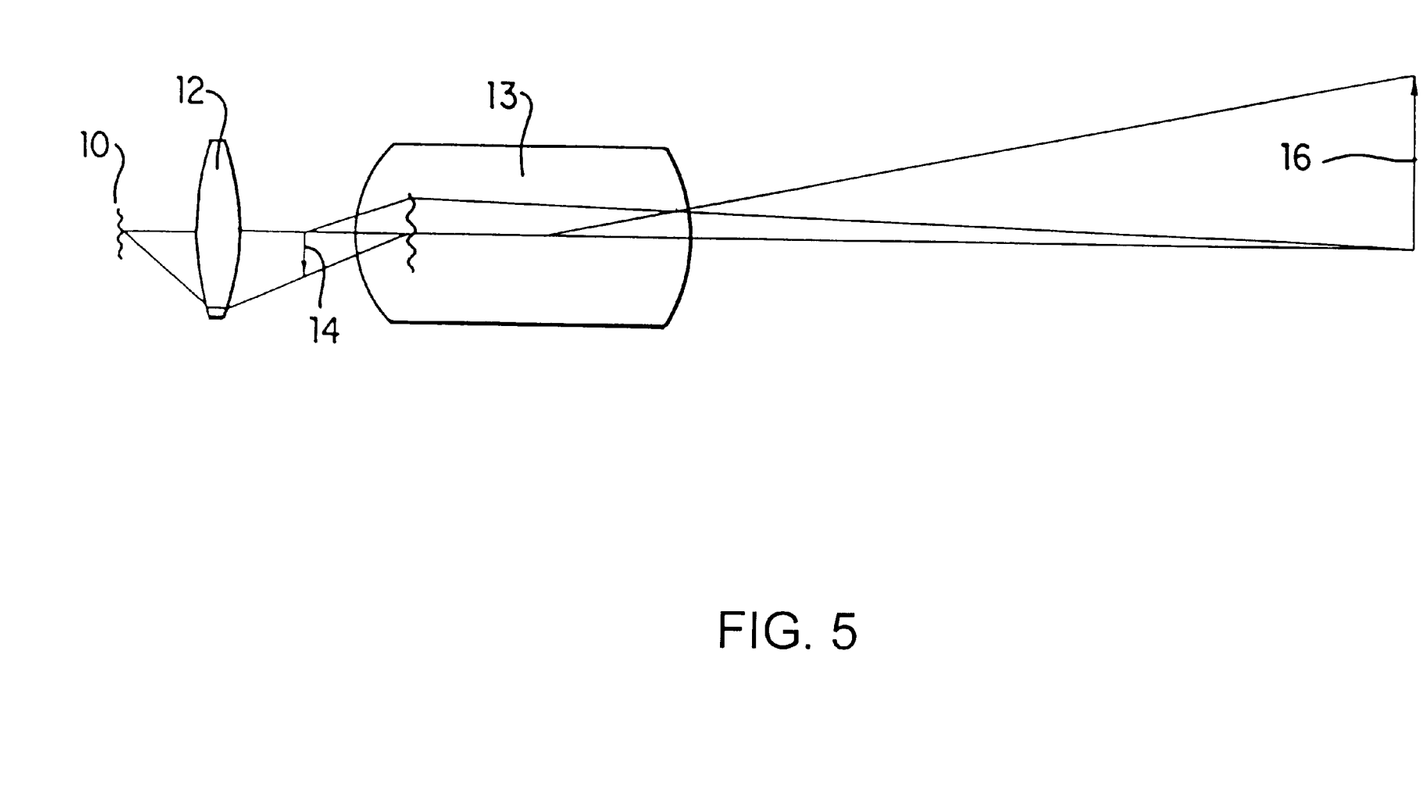
FIG. 5 is a schematic diagram showing an overall projection lens system in which the projection lens of the present invention can be used.

Projection lens systems (also referred to herein as "projection systems") are used to form an image of an object on a viewing screen. The basic structure of such a system is shown in FIG. 5, wherein 10 is a light source (e.g., a tungsten-halogen lamp), 12 is illumination optics which forms an image of the light source (hereinafter referred to as the "output" of the illumination system), 14 is the object which is to be projected (e.g., a matrix of on and off pixels), and 13 is a projection lens, composed of multiple lens elements, which forms an enlarged image of object 14 on viewing screen 16. FIG. 5 is drawn for the case of a LCD panel where the output of the illumination system strikes the back of the panel and passes through those pixels which are transparent. DMDs, on the other hand, work by reflection and thus the output of the illumination system is routed to the front of the panel by a prism or similar device.

Projection lens systems in which the object is a pixelized panel are used in a variety of applications, including data display systems. Such projection lens systems preferably employ a single projection lens which forms an image of either a single panel having, for example, red, green, and blue pixels, or three individual panels, one for each color. In some cases, two panels are used, one for two colors, e.g., red and green, and the other for one color, e.g., blue. A spinning filter wheel or similar device is associated with the panel for the two colors and the panel is alternately fed information for the two colors in synchrony with the filter.

There exists a need in the art for a projection lens for use with a pixelized panel which simultaneously has at least the following properties: (1) the ability to zoom between a maximum effective focal length and a minimum effective focal length; (2) a long back focal length, e.g., a back focal length greater than the lens' minimum effective focal length; (3) a high level of color correction; (4) low distortion; and (5) low sensitivity to temperature changes.

A projection lens which can efficiently operate over a range of focal lengths is desirable since it allows the projection system to be used with screens of different sizes and halls of different dimensions without the need to change any of the components of the system. The challenge, of course, is to maintain a high level of aberration correction throughout the operative range of focal lengths without unduly complicating the lens design.

A long back focal length, i.e., the distance from the last lens surface to the pixelized panel, is needed, especially where multiple panels are used, to accommodate the optical elements, e.g., filters, beam splitters, prisms, and the like, used in combining the light from the different color optical paths which the lens system projects towards the viewing screen. In addition, a long back focal length allows the output of the illumination system to be in the vicinity of the projection lens for output distances which are relatively large. Relatively large output distances are desirable since they provide relatively shallow entrance angles for the light at the pixelized panel which is especially important in the case of LCD panels.

A high level of color correction is important because color aberrations can be easily seen in the image of a pixelized panel as a smudging of a pixel or, in extreme cases, the complete dropping of a pixel from the image. These problems are typically most severe at the edges of the field.

All of the chromatic aberrations of the system need to be addressed, with lateral color, chromatic variation of coma, and chromatic aberration of astigmatism typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels, the lenses of the examples being designed for such use. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In order to produce an image of sufficient brightness, a substantial amount of light must pass through the projection lens. As a result, a significant temperature difference normally exists between room temperature and the lens' operating temperature. In addition, the lens needs to be able to operate under a variety of environmental conditions. For example, projection lens systems are often mounted to the ceiling of a room, which may comprise the roof of a building where the ambient temperature can be substantially above 40° C. To address these effects, a projection lens whose optical properties are relatively insensitivity to temperature changes is needed.

One way to address the temperature sensitivity problem is to use lens elements composed of glass. Compared to plastic, the radii of curvature and the index of refraction of a glass element generally change less than those of a plastic element. However, glass elements are generally more expensive than plastic elements, especially if aspherical surfaces are needed for aberration control. They are also heavier. As described below, plastic elements can be used and temperature insensitivity still achieved provided the powers and locations of the plastic elements are properly chosen.

The projection lenses described below achieve all of the above requirements and can be successfully used in producing relatively low cost projection lens systems capable of forming a high quality color image of a pixelized panel on a viewing screen.

DESCRIPTION OF THE PRIOR ART

Projection lenses for use with pixelized panels are described in various patents including Taylor, U.S. Pat. No. 4,189,211, Tanaka et al., U.S. Pat. No. 5,042,929, Yano et al., U.S. Pat. No. 5,179,473, Moskovich, U.S. Pat. No. 5,200,861, Moskovich, U.S. Pat. No. 5,218,480, Iizuka et al., U.S. Pat. No. 5,278,698, Betensky, U.S. Pat. No. 5,313,330, and Yano, U.S. Pat. No. 5,331,462.

Discussions of LCD systems can be found in Gagnon et al., U.S. Pat. No. 4,425,028, Gagnon, U.S. Pat. No. 4,461,542, Ledebuhr, U.S. Pat. No. 4,826,311, and EPO Patent Publication No. 311,116.

SUMMARY OF THE INVENTION

In view of the foregoing, it is an object of the present invention to provide improved projection lenses for use with pixelized panels which simultaneously have each of the five desired properties discussed above. This object is achieved by means of a zoom projection lens which comprises in order from the lens' image side to its object side (i.e., from its long conjugate side to its short conjugate side):

(A) a first lens unit (U1) having a negative power and comprising a first lens element (L1) composed of plastic and having at least one aspherical surface and at least two other lens elements (L2 and L3), one of which has a positive power and the other of which has a negative power, the dispersion of the positive lens element (L2) being greater than the dispersion of the negative lens element (L3);

(B) a second lens unit (U2) separated from the first lens unit by an axial space, the second lens unit having a positive power and comprising a first lens subunit (U2$_{S1}$) on the image side of the second lens unit and a second lens subunit (U2$_{S2}$) on the object side of the second lens unit, wherein each of the subunits has a positive power, the power of the second lens subunit is greater than the power of the first lens subunit, and the lens' aperture stop is located within the first lens subunit or is closer to the first lens subunit than to either the first lens unit or the second lens subunit for the minimum effective focal length of the lens; and (C) zoom means for varying the lens' effective focal length between its maximum and minimum values by changing the axial space between the first and second lens units;

wherein:

$$D_{12}/f_{min} > 1.0, \quad (1)$$

$$D_{S1S2}/f_{min} > 1.0, \quad (2)$$

$$D_{12}/D_{S1S2} > 1.0, \quad (3)$$

and $$BFL/f_{min} > 1.0, \quad (4)$$

where:

(i) $f_{min}$ is the minimum effective focal length of the lens;

(ii) BFL is the back focal length of the lens in air for an object located at infinity along the long conjugate side of the lens and for the lens having its minimum effective focal length;

(iii) $D_{12}$ is the axial distance between the first and second lens units for the lens having its minimum effective focal length ($D_{12}$ is measured from the last surface of U1 to the first surface of U2); and (iv) $D_{S1S2}$ is the axial distance between the first and second subunits of the second lens unit ($D_{S1S2}$ is measured from the last surface of U2$_{S1}$ to the first surface of U2$_{S2}$).

Limitations (1)–(3) relate to the physical structure of the projection lens. When the limitations are satisfied, limitation (4) can be achieved while still achieving high levels of color correction and low levels of distortion over the lens' zoom range.

The projection lenses of the invention are preferably designed to be substantially athermal. As discussed fully below, this is done by using glass and plastic lens elements and by balancing the powers of the plastic lens elements having substantial optical power. In this way, changes in the power of the positive lens elements caused by temperature changes are compensated for by changes in the power of the negative lens elements, thus providing substantially constant overall optical properties for the projection lens as its temperature changes.

BRIEF DESCRIPTION OF THE DRAWINGS

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are of the retrofocus type and comprise a front negative lens unit (U1) and a rear positive lens unit (U2).

The first lens unit includes at least three lens elements L1, L2, and L3, where L1 is composed of plastic and has at least one and preferably two aspherical surfaces, L2 has a positive power and is composed of a high dispersion material, and L3 has a negative power and is composed of a low dispersion material. By the inclusion of at least these elements, the first lens unit can be moved through substantial distances for zooming while maintaining the lens' overall high level of aberration correction, including its high levels of color and distortion correction.

In general terms, a high dispersion material is a material having a dispersion like flint glass and a low dispersion material is a material having a dispersion like crown glass. More particularly, high dispersion materials are those having V-values ranging from 20 to 50 for an index of refraction in the range from 1.85 to 1.5, respectively, and low dispersion materials are those having V-values ranging from 35 to 75 for the same range of indices of refraction.

Preferably, lens elements L2 and L3 are composed of glass, although plastic materials can be used if desired. For plastic lens elements, the high and low dispersion materials can be styrene and acrylic, respectively. Other plastics can, of course, be used if desired. For example, in place of styrene, polycarbonates and copolymers of polystyrene and acrylic (e.g., NAS) having flint-like dispersions can be used. See The Handbook of Plastic Optics, U.S. Precision Lens, Inc., Cincinnati, Ohio, 1983, pages 17–29.

In general terms, the first lens unit and, in particular, the aspherical surfaces of element L1, contribute to the correction of the system's distortion which, as discussed above, needs to be highly corrected for lens systems used with pixelized panels. Preferably, the distortion correction is better than about 1.0 percent throughout the lens' zoom range.

The second lens unit comprises two subunits $U2_{S1}$ and $U2_{S2}$, each of which has a positive power, with the power of $U2_{S2}$ being greater than the power of $U2_{S1}$. The lens elements making up these subunits are closely spaced to one another, the maximum spacing between any two elements being less than 20%, and preferably less than 10%, of the spacing $D_{S1S2}$ between the subunits.

In accordance with the invention, the aperture stop of the projection lens is located in the vicinity of $U2_{S1}$. In this way, the size of the lens elements of unit U1 and subunit $U2_{S2}$ are minimized. Also, this location of the aperture stop allows $U2_{S1}$ to primarily correct aperture-dependent aberrations such as spherical aberration.

The lenses of Examples 1–4 below were designed using a conventional fixed aperture stop. Alternatively, the lenses can be designed using the location of the output of the illumination system as a pseudo-aperture stop/entrance pupil of the projection lens (see Betensky, U.S. Pat. No. 5,313, 330, the relevant portions of which are incorporated herein by reference).

The second lens unit and, in particular, the first subunit of that unit preferably includes a plastic lens element having at least one aspherical lens surface. Subunit $U2_{S2}$ may also include an aspherical surface (see Examples 3 and 4 below). These aspherical surfaces in combination with the aspherical surface(s) of the first unit serve to correct the lens' spherical aberration, astigmatism, coma, and distortion. To provide color correction, both flint-type and crown-type materials are used for the lens elements of the second lens unit.

As discussed above, zooming of the projection lenses of the invention is achieved by varying the spacing between the first and second lens units. Focusing is achieved by moving the entire lens relative to the pixelized panel. Conventional mechanisms known in the art are used to move the lens relative to the pixelized panel and to move the first and second lens units relative to one another.

The projection lenses of the invention are preferably athermalized so that the optical performance of the system does not substantially change as the projection lens is heated from room temperature to its operating temperature. More specifically, the thermally-induced change in the modulation transfer function of the system at the system's characteristic spatial frequency is preferably less than about 25%, where the characteristic spatial frequency is equal to one over twice the pixel size. The desired thermal stabilization is achieved through the selection and placement in the lens of the plastic lens elements.

Ordinarily, the use of plastic lens elements has the drawback that the refractive index of plastic optical materials changes significantly with temperature. Another effect is the change in shape, i.e., expansion or contraction, of plastic optical materials with temperature. This latter effect is usually less significant than the change in index of refraction.

If only low power plastic lens elements are used in a lens it is possible to achieve a balance between the thermal changes in the plastic optics and the thermal changes in the plastic or aluminum mechanical components of the system, e.g., the lens barrel which is usually the major mechanical source of thermally-caused focus changes. The unrestricted use of optical plastics in a design, i.e., the ability to use plastic lens elements of relatively high power, has advantages in that, since the plastic lens elements can be readily molded, non-spherical optical surfaces (aspherics) can be used to maximize the capability (performance) of a particular lens design. The use of relatively high power plastic elements also leads to a lens having an overall lower cost and lower weight, especially where the lens design involves large lens elements.

If the net plastic optical power in a design is significant, then athermalization needs to be performed or the focus of the lens will change significantly as the lens' temperature changes from room temperature to its operating temperature. This is especially so with projectors which must transmit significant amounts of light to a viewing screen and thus have an operating temperature significantly above room temperature.

For the projection lenses of the present invention, athermalization is achieved by balancing positive and negative plastic optical power, while also taking into account both the location of the plastic lens elements and the marginal ray heights at those elements.

The location of the plastic lens elements is significant in terms of the amount of temperature change the element will undergo and thus the amount of change which will occur in the element's index of refraction. In general, elements close to the light source or the image of the light source will undergo greater temperature changes. In practice, a temperature distribution in the region where the projection lens is to be located is measured with the light source and its associated illumination optics operating and those measured values are used in the design of the projection lens.

The marginal ray height at a particular plastic lens element determines, for a given thermal change, whether changes in the element's index of refraction will be significant with regard to the overall thermal stability of the lens. Elements for which the marginal ray height is small, e.g., elements near the focus of the system, will in general have less effect on the overall thermal stability of the system than elements for which the marginal ray height is large.

Based on the foregoing considerations, athermalization is achieved by balancing the amount of negative and positive power in the plastic lens elements with the contributions of particular elements being adjusted based on the temperature change which the element is expected to undergo and the marginal ray height at the element. In practice, this athermalization procedure is incorporated into a computerized lens design program as follows. First, a ray trace is performed at a first temperature distribution and a back focal distance is calculated. The ray trace can be a paraxial ray trace for the marginal ray. Second, the same ray trace is performed at a second temperature distribution and the back focal distance is again calculated. Neither the first nor the second temperature distribution need be constant over the entire lens but can, and in the typical case does, vary from lens element to lens element. The calculated back focal distances are then constrained to a constant value as the design of the system is optimized using the lens design program.

It should be noted that the foregoing approach assumes that the mechanical mounts for the projection lens and the pixelized panel hold the distance between the last lens surface and the panel substantially constant as the temperature of the system changes. If such an assumption is not warranted, other provisions can be made for performing the athermalization, e.g., a measured value for the relative movement of the mechanical mounts can be included in the process or an alternate distance, e.g., the distance between the front lens surface and the panel, can be assumed to be mechanically fixed.

FIGS. 1 to 4 illustrate various projection lenses constructed in accordance with the invention. Corresponding prescriptions and optical properties appear in Tables 1 to 4, respectively. HOYA or SCHOTT designations are used for the glasses employed in the lens systems. Equivalent glasses made by other manufacturers can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–4.

The abbreviations used in the tables are as follows:

| | |
|---|---|
| EFL | effective focal length |
| FVD | front vertex distance |
| f/ | f-number |
| ENP | entrance pupil as seen from the long conjugate |
| EXP | exit pupil as seen from the long conjugate |
| BRL | barrel length |
| OBJ HT | object height |
| MAG | magnification |
| STOP | location and size of aperture stop |
| IMD | image distance |
| OBD | object distance |
| OVL | overall length. |

The designation "a" associated with various surfaces in the tables represents an aspheric surface, i.e., a surface for which at least one of D, E, F, G, H, or I in the above equation is not zero; and the designation "c" indicates a surface for which k in the above equation is not zero. IMD and OBD values are not reported in Table 4 since the lens of this example was designed with the viewing screen set at infinity. Instead, a half field of view in the direction of the viewing screen is reported for this lens (the "FIELD" values). All dimensions given in the tables are in millimeters.

The tables are constructed on the assumption that light travels from left to right in the figures. In actual practice, the viewing screen will be on the left and the pixelized panel will be on the right, and light will travel from right to left. In particular, the references in the tables to objects and images is reverse from that used in the rest of the specification and in the claims.

The correspondence between the various elements and surfaces of the lenses of Tables 1–4 and the L1, L2, L3, U1, U2, U2$_{S1}$ and U2$_{S2}$ terminology discussed above is set forth in Table 5. Surface 16 in Table 1 and surface 17 in Table 2 are vignetting surfaces. Surfaces 22–25 in Table 1, 23–26 in Table 2, 21–24 in Table 3, and 20–23 in Table 4 represent a prism and related DMD components located at the back end of the lens system.

Table 6 summarizes various properties of the lens systems of the invention. As shown in this table, the lens systems of the examples satisfy limitations (1) through (3) set forth above, and as a result, achieve the desired long back focal length of limitation (4). These lenses can be used with a DMD panel which has an overall size of 13.6 mm×10.2 mm and a pixel size of 0.017 mm×0.017 mm, the panel being offset from the lens' optical axis by 50% in the vertical (short) direction and being used with near telecentric illumination. Throughout their zoom ranges, the lenses have a MTF at 33 cycles/mm greater than 0.5, a distortion less than 1%, and a lateral color blur less than 0.6×0.017 (i.e., the width of a pixel) for wavelengths in the range from 465 nanometers to 608 nanometers.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | ac | 86.2677 | 7.00000 | ACRYLIC | 71.60 |
| 2 | ac | 67.7489 | 11.86077 | | 65.70 |
| 3 | | 174.4736 | 11.00000 | BACED5 | 65.00 |
| 4 | | −111.9085 | 10.40412 | | 63.90 |
| 5 | ac | 46.9066 | 5.00000 | ACRYLIC | 39.30 |
| 6 | a | 51.3890 | 6.18000 | | 35.90 |
| 7 | | −45.4826 | 2.64000 | NBFD11 | 33.80 |
| 8 | | 33.6488 | 5.00000 | FD6 | 31.50 |
| 9 | | 70.8194 | Space 1 | | 30.90 |
| 10 | | Aperture stop | 2.00000 | | 26.90 |
| 11 | | −126.4483 | 3.30000 | FD2 | 28.00 |
| 12 | | −381.9395 | 4.90000 | FC5 | 29.10 |

TABLE 1-continued

| | | | | | |
|---|---|---|---|---|---|
| 13 | | −54.2642 | 0.20000 | | 30.20 |
| 14 | | 38.1984 | 4.22000 | ACRYLIC | 32.20 |
| 15 | a | 43.6728 | 34.44731 | | 31.90 |
| 16 | | ∞ | 25.27000 | | 41.10 |
| 17 | | 2457.3450 | 3.50000 | FDS90 | 49.60 |
| 18 | | 133.1813 | 12.65000 | FC5 | 50.60 |
| 19 | | −81.8475 | 0.20000 | | 52.60 |
| 20 | | 123.2898 | 7.42000 | LAC14 | 53.90 |
| 21 | | −266.5591 | Space 2 | | 53.60 |
| 22 | | ∞ | 102.50000 | BSC7 | 52.00 |
| 23 | | ∞ | 0.20000 | | 29.50 |
| 24 | | ∞ | 3.00000 | ZNC7 | 29.50 |
| 25 | | ∞ | Image Distance | | 29.00 |

Symbol Description a - Polynomial asphere
c - Conic section

Conics

| Surface Number | Constant |
|---|---|
| 1 | 2.0000E−01 |
| 2 | −7.0000E+00 |
| 5 | 2.0000E+00 |

Even Polynomial Aspheres

| Surf. No. | D | E | F | G | H | I |
|---|---|---|---|---|---|---|
| 1 | 4.9254E−06 | −1.0703E−09 | −6.6411E−13 | 9.7387E−18 | 9.5365E−20 | −1.0507E−22 |
| 2 | 9.6019E−06 | −1.5928E−09 | −1.6599E−12 | 3.4083E−16 | −2.2867E−19 | −9.9641E−23 |
| 5 | −6.9665E−06 | −2.8894E−09 | −8.7976E−12 | 8.7963E−16 | −2.8417E−17 | 1.1705E−19 |
| 6 | −1.2589E−05 | −7.3471E−09 | 2.7389E−12 | −2.5931E−14 | 5.8551E−17 | 6.0176E−20 |
| 15 | 1.4361E−06 | 5.2291E−09 | −3.3025E−11 | 1.1352E−13 | −1.8401E−16 | 1.0088E−19 |

Variable Spaces

| Zoom Pos. | Space 1 T (9) | Space 2 T (21) | Image Distance | Focal Shift |
|---|---|---|---|---|
| 1 | 79.301 | 1.479 | 9.995 | 0.006 |
| 2 | 2.335 | 53.366 | 10.001 | −0.186 |
| 3 | 35.181 | 21.302 | 9.997 | −0.081 |

SYSTEM FIRST ORDER PROPERTIES, POS 1

OBJ. HT: −1870.0   f/ 2.98   MAG: −0.0063
STOP: 0.00 after surface 10.   DIA: 26.730
EFL: 44.9065   FVD: 353.668   ENP: 114.145
IMD: 9.99499   BRL: 343.673   EXP: −159749.
OBD: −7013.89   OVL: 7367.56
SYSTEM FIRST ORDER PROPERTIES, POS 2

OBJ. HT: −1900.0   f/ 3.00   MAG: −0.0063
STOP: 0.00 after surface 10.   DIA: 26.695
EFL: 97.4658   FVD: 328.594   ENP: 60.8142
IMD: 10.0010   BRL: 318.593   EXP: −159801.
OBD: −15410.0   OVL: 15738.6
SYSTEM FIRST ORDER PROPERTIES, POS 3

OBJ. HT: −1900.0   f/ 2.98   MAG: −0.0063
STOP: 0.00 after surface 10.   DIA: 26.787
EFL: 64.9998   FVD: 329.372   ENP: 93.7528
IMD: 9.99699   BRL: 319.375   EXP: −159769.
OBD: −10223.7   OVL: 10553.1

First Order Properties of Elements

| Element Number | Surface Numbers | | Power | f |
|---|---|---|---|---|
| 1 | 1 | 2 | −0.13691E−02 | −730.42 |
| 2 | 3 | 4 | 0.95543E−02 | 104.67 |
| 3 | 5 | 6 | 0.12568E−02 | 795.69 |
| 4 | 7 | 8 | −0.41456E−01 | −24.122 |

TABLE 1-continued

| | | | | |
|---|---|---|---|---|
| 5 | 8 | 9 | 0.13440E−01 | 74.403 |
| 6 | 11 | 12 | −0.34328E−02 | −291.31 |
| 7 | 12 | 13 | 0.77714E−02 | 128.68 |
| 8 | 14 | 15 | 0.20332E−02 | 491.83 |
| 9 | 17 | 18 | −0.60680E−02 | −164.80 |
| 10 | 18 | 19 | 0.94626E−02 | 105.68 |
| 11 | 20 | 21 | 0.82362E−02 | 121.42 |

First-Order Properties of Doublets

| Element Numbers | | Surface Numbers | | Power | f' |
|---|---|---|---|---|---|
| 4 | 5 | 7 | 9 | −0.28984E−01 | −34.502 |
| 6 | 7 | 11 | 13 | 0.45205E−02 | 221.21 |
| 9 | 10 | 17 | 19 | 0.36964E−02 | 270.53 |

First Order Properties of Groups

| Group Number | Surface Numbers | | Power | f' |
|---|---|---|---|---|
| 1 | 1 | 9 | −0.12395E−01 | −80.680 |
| 2 | 10 | 21 | 0.12588E−01 | 79.442 |

First Order Properties of the Lens

| Zoom Position Number | Power | f' |
|---|---|---|
| 1 | 0.22268E−01 | 44.907 |
| 2 | 0.10260E−01 | 97.466 |
| 3 | 0.15385E−01 | 65.000 |

TABLE 2

| Surf. No. | Type | Radius | Thickness | Glass | Clear Aperture Diameter |
|---|---|---|---|---|---|
| 1 | | 132.2623 | 12.20000 | BACD2 | 66.38 |
| 2 | | −151.0216 | 0.85000 | | 64.02 |
| 3 | a | 72.4851 | 6.78000 | ACRYLIC | 52.28 |
| 4 | ac | 78.8335 | 5.97000 | | 45.65 |
| 5 | a | 171.1424 | 5.00000 | ACRYLIC | 39.81 |
| 6 | | 91.0328 | 7.00000 | | 35.45 |
| 7 | | −38.0340 | 2.64000 | NBFD13 | 32.71 |
| 8 | | 38.0340 | 1.70000 | | 31.24 |
| 9 | | 47.8102 | 5.00000 | FDS90 | 31.76 |
| 10 | | 293.4792 | Space 1 | | 31.54 |
| 11 | | Aperture stop | 2.00000 | | 28.83 |
| 12 | | −124.3987 | 2.70000 | FD11 | 29.34 |
| 13 | | −197.7516 | 4.70000 | FC5 | 30.40 |
| 14 | | −53.0339 | 0.20000 | | 31.54 |
| 15 | | 41.2885 | 4.22000 | ACRYLIC | 33.34 |
| 16 | a | 49.1002 | 40.32000 | | 32.99 |
| 17 | | ∞ | 25.27000 | | 42.48 |
| 18 | | 1596.4179 | 3.50000 | FDS90 | 50.67 |
| 19 | | 132.5951 | 12.22000 | FC5 | 51.67 |
| 20 | | −84.0672 | 0.20000 | | 53.37 |
| 21 | | 134.8605 | 7.42000 | LAC14 | 54.55 |
| 22 | | −302.4425 | Space 2 | | 54.37 |
| 23 | | ∞ | 102.50000 | BSC7 | 49.81 |
| 24 | | ∞ | 0.20000 | | 28.00 |
| 25 | | ∞ | 3.00000 | ZNC7 | 28.00 |
| 26 | | ∞ | Image Distance | | 27.00 |

Symbol Description a - Polynomial asphere
c - Conic section

TABLE 2-continued

Conics

| Surface Number | Constant |
|---|---|
| 4 | -6.0000E+00 |

Even Polynomial Aspheres

| Surf. No. | D | E | F | G | H | I |
|---|---|---|---|---|---|---|
| 3 | -1.8472E-06 | 1.7951E-09 | 3.8227E-12 | -6.4936E-15 | -1.6112E-19 | -2.0328E-21 |
| 4 | -3.0348E-09 | 1.2372E-08 | -2.6347E-12 | 1.2805E-14 | -4.2741E-18 | -7.2023E-20 |
| 5 | 5.5142E-06 | 2.3098E-08 | -7.8388E-11 | 4.4028E-13 | -1.1070E-15 | 1.1697E-18 |
| 16 | 1.5173E-06 | 1.4870E-09 | -1.2077E-11 | 5.8468E-14 | -1.2585E-16 | 9.5929E-20 |

Variable Spaces

| Zoom Pos. | Space 1 T (10) | Space 2 T (22) | Image Distance | Focal Shift |
|---|---|---|---|---|
| 1 | 86.229 | 1.805 | 10.000 | 0.020 |
| 2 | 3.100 | 59.946 | 10.000 | -0.077 |
| 3 | 39.546 | 23.024 | 9.999 | -0.043 |

SYSTEM FIRST ORDER PROPERTIES, POS 1

OBJ. HT: -1870.0    f/ 2.98    MAG: -0.0063
STOP: 0.00 after surface 11.    DIA: 28.648
EFL: 44.9076    FVD: 353.624    ENP: 104.166
IMD: 10.0001    BRL: 343.624    EXP: -6625.61
OBD: -7024.32    OVL: 7377.95

SYSTEM FIRST ORDER PROPERTIES, POS 2

OBJ. HT: -1900.0    f/ 3.05    MAG: -0.0063
STOP: 0.00 after surface 11.    DIA: 28.428
EFL: 99.8923    FVD: 328.636    ENP: 53.1296
IMD: 9.99995    BRL: 318.636    EXP: -6683.75
OBD: -15804.3    OVL: 16132.9

SYSTEM FIRST ORDER PROPERTIES, POS 3

OBJ. HT: -1900.0    f/ 3.00    MAG: -0.0063
STOP: 0.00 after surface 11.    DIA: 28.618
EFL: 64.9997    FVD: 328.159    ENP: 85.4139
IMD: 9.99919    BRL: 318.160    EXP: -6646.83
OBD: -10232.6    OVL: 10560.8

First Order Properties of Elements

| Element Number | Surface Numbers | | Power | f' |
|---|---|---|---|---|
| 1 | 1 | 2 | 0.85092E-02 | 117.52 |
| 2 | 3 | 4 | 0.74223E-03 | 1347.3 |
| 3 | 5 | 6 | -0.24866E-02 | -402.16 |
| 4 | 7 | 8 | -0.43298E-01 | -23.096 |
| 5 | 9 | 10 | 0.15111E-01 | 66.177 |
| 6 | 12 | 13 | -0.23229E-02 | -430.49 |
| 7 | 13 | 14 | 0.68217E-02 | 146.59 |
| 8 | 15 | 16 | 0.22424E-02 | 445.95 |
| 9 | 18 | 19 | -0.59064E-02 | -169.31 |
| 10 | 19 | 20 | 0.93313E-02 | 107.17 |
| 11 | 21 | 22 | 0.74504E-02 | 134.22 |

First-Order Properties of Doublets

| Element Numbers | | Surface Numbers | | Power | f' |
|---|---|---|---|---|---|
| 6 | 7 | 12 | 14 | 0.46318E-02 | 215.90 |
| 9 | 10 | 18 | 20 | 0.36975E-02 | 270.45 |

First Order Properties of Groups

| Group Number | Surface Numbers | | Power | f' |
|---|---|---|---|---|
| 1 | 1 | 10 | -0.12460E-01 | -80.259 |
| 2 | 11 | 22 | 0.11834E-01 | 84.502 |

TABLE 2-continued

First Order Properties of the Lens

| Zoom Position Number | Power | f' |
|---|---|---|
| 1 | 0.22268E-01 | 44.908 |
| 2 | 0.10011E-01 | 99.892 |
| 3 | 0.15385E-01 | 65.000 |

TABLE 3

| Surf. No. | Type | Radius | Thickness | Glass | Clear Aperture Diameter |
|---|---|---|---|---|---|
| 1 | a | 128.2392 | 4.00000 | ACRYLIC | 63.00 |
| 2 | a | 31.3821 | 30.58783 | | 54.00 |
| 3 | | 450.3363 | 3.00000 | TAF1 | 41.02 |
| 4 | | 46.1980 | 7.18800 | | 38.55 |
| 5 | | 45.7950 | 14.80000 | F5 | 39.06 |
| 6 | | -29.3460 | 3.00000 | TAF1 | 38.10 |
| 7 | | -5716.6802 | Space 1 | | 37.58 |
| 8 | | Aperture stop | 34.00000 | | 29.48 |
| 9 | a | 83.6199 | 5.80000 | STYRENE | 42.47 |
| 10 | a | 134.6422 | 1.40000 | | 42.80 |
| 11 | | 128.2945 | 6.50000 | FC5 | 43.26 |
| 12 | | -531.4002 | 35.26087 | | 43.75 |
| 13 | | -129.0769 | 4.00000 | FD6 | 48.14 |
| 14 | | 214.4242 | 0.30000 | | 50.01 |
| 15 | | 102.0592 | 8.50000 | FC5 | 51.44 |
| 16 | | -232.4415 | 0.20000 | | 52.35 |
| 17 | | 87.4305 | 14.00000 | FC5 | 53.83 |
| 18 | | -61.0835 | 0.30000 | | 53.66 |
| 19 | | -71.9037 | 7.50000 | ACRYLIC | 52.73 |
| 20 | a | -111.6731 | Space 2 | | 51.54 |
| 21 | | ∞ | 102.50000 | BSC7 | 48.00 |
| 22 | | ∞ | 1.00000 | | 28.00 |
| 23 | | ∞ | 3.00000 | ZNC7 | 28.00 |
| 24 | | ∞ | Image distance | | 28.00 |

Symbol Description a - Polynomial asphere

Even Polynomial Aspheres

| Surf. No. | D | E | F | G | H | I |
|---|---|---|---|---|---|---|
| 1 | 1.1410E-06 | -3.1238E-09 | 3.5837E-12 | -1.2948E-15 | -3.0787E-18 | 2.3045E-21 |
| 2 | -2.2092E-06 | -3.6274E-09 | -5.9502E-12 | 1.2320E-14 | -3.3389E-17 | 2.1782E-20 |
| 9 | 9.0576E-07 | -4.7105E-10 | -1.4125E-12 | 3.4563E-15 | 8.6812E-19 | -6.5572E-21 |
| 10 | 1.2901E-06 | -1.1947E-09 | 9.4671E-13 | 3.7844E-16 | 1.2933E-18 | -4.8294E-21 |
| 20 | 1.8062E-06 | 1.3691E-10 | 3.9608E-13 | -2.4610E-16 | -6.1819E-19 | 9.0090E-22 |

Variable Spaces

| Zoom Pos. | Space 1 T (7) | Space 2 T (20) | Focal Shift | Image Distance |
|---|---|---|---|---|
| 1 | 113.979 | 1.000 | 0.035 | 9.935 |
| 2 | 19.540 | 36.000 | -0.030 | 9.997 |

SYSTEM FIRST ORDER PROPERTIES, POS 1

OBJ. HT: -2340.0  f/ 3.05  MAG: -0.0050
STOP: 0.00 after surface 8.  DIA: 28.437
EFL: 21.1106  FVD: 411.751  ENP: 49.8683
IMD: 9.93546  BRL: 401.816  EXP: -2390.71
OBD: -4172.44  OVL: 4584.20
SYSTEM FIRST ORDER PROPERTIES, POS 2

OBJ. HT: -2400.0  f/ 3.05  MAG: -0.0050
STOP: 0.00 after surface 8.  DIA: 29.204
EFL: 40.9957  FVD: 352.373  ENP: 39.0837

TABLE 3-continued

IMD: 9.99664  BRL: 342.377  EXP: −2425.71
OBD: −8160.74  OVL: 8513.12

First Order Properties of Elements

| Element Number | Surface Numbers | | Power | f' |
|---|---|---|---|---|
| 1 | 1 | 2 | −0.11722E−01 | −85.312 |
| 2 | 3 | 4 | −0.15029E−01 | −66.538 |
| 3 | 5 | 6 | 0.31423E−01 | 31.824 |
| 4 | 6 | 7 | −0.26308E−01 | −38.011 |
| 5 | 9 | 10 | 0.28105E−02 | 355.81 |
| 6 | 11 | 12 | 0.47178E−02 | 211.96 |
| 7 | 13 | 14 | −0.10138E−01 | −98.636 |
| 8 | 15 | 16 | 0.68395E−02 | 146.21 |
| 9 | 17 | 18 | 0.13181E−01 | 75.866 |
| 10 | 19 | 20 | −0.22931E−02 | −436.09 |

First-Order Properties of Doublets

| Element Numbers | | Surface Numbers | | Power | f' |
|---|---|---|---|---|---|
| 3 | 4 | 5 | 7 | 0.83195E−02 | 120.20 |

First Order Properties of Groups

| Group Number | Surface Numbers | | Power | f' |
|---|---|---|---|---|
| 1 | 1 | 7 | −0.20702E−01 | −48.305 |
| 2 | 8 | 20 | 0.11753E−01 | 85.088 |

First Order Properties of the Lens

| Zoom Position Number | Power | f' |
|---|---|---|
| 1 | 0.47369E−01 | 21.111 |
| 2 | 0.24393E−01 | 40.996 |

TABLE 4

| Surf. No. | Type | Radius | Thickness | Glass | Clear Aperture Diameter |
|---|---|---|---|---|---|
| 1 | a | 115.1192 | 4.00000 | ACRYLIC | 62.50 |
| 2 | a | 28.6752 | 21.75889 | | 52.00 |
| 3 | | 256.8968 | 3.00000 | TAF1 | 46.00 |
| 4 | | 47.0695 | 8.52922 | | 43.00 |
| 5 | | 48.3700 | 16.60000 | F5 | 42.00 |
| 6 | | −32.6430 | 3.00000 | TAF1 | 41.87 |
| 7 | | ∞ | Space 1 | | 40.73 |
| 8 | | Aperture stop | 28.00000 | | 30.60 |
| 9 | a | 96.1698 | 5.80000 | STYRENE | 40.58 |
| 10 | a | 117.8798 | 1.40000 | | 41.21 |
| 11 | | 130.2010 | 6.50000 | FL6 | 41.69 |
| 12 | | −476.3686 | 36.86854 | | 42.32 |
| 13 | | −128.7857 | 4.00000 | FD6 | 49.06 |
| 14 | | 179.5482 | 8.00000 | FC5 | 51.41 |
| 15 | | −168.9204 | 0.50000 | | 53.11 |
| 16 | | 69.8300 | 16.50000 | FC5 | 56.50 |
| 17 | | −62.5511 | 0.50000 | | 56.50 |
| 18 | a | −87.8192 | 7.00000 | ACRYLIC | 54.80 |
| 19 | a | −103.0259 | Space 2 | | 54.90 |
| 20 | | ∞ | 102.50000 | BSC7 | 50.00 |
| 21 | | ∞ | 1.00000 | | 29.00 |
| 22 | | ∞ | 3.00000 | ZNC7 | 29.00 |
| 23 | | ∞ | Image distance | | 28.00 |

Symbol Description a - Polynomial asphere

TABLE 4-continued

Even Polynomial Aspheres

| Surf. No. | D | E | F | G | H | I |
|---|---|---|---|---|---|---|
| 1 | 1.4998E−06 | −3.5353E−09 | 3.7569E−12 | −1.0504E−15 | −3.0877E−18 | 2.4320E−21 |
| 2 | −2.3321E−06 | −4.6694E−09 | −1.0033E−11 | 1.7968E−14 | −3.6978E−17 | 1.7499E−20 |
| 9 | 9.4305E−07 | −1.4481E−09 | −1.3315E−12 | 1.7778E−15 | −1.2101E−18 | −5.2403E−21 |
| 10 | 1.3499E−06 | −1.7169E−09 | −6.5111E−13 | 5.5571E−16 | 1.7201E−18 | −8.3075E−21 |
| 18 | 1.2783E−07 | 1.0188E−10 | 6.5284E−14 | −2.7744E−16 | −3.2526E−19 | −1.5926E−22 |
| 19 | 1.9315E−06 | 3.8346E−10 | 2.3320E−13 | −1.0526E−16 | −6.0027E−19 | −1.6353E−22 |

Variable Spaces

| Zoom Pos. | Space 1 T (7) | Space 2 T (19) | Focal Shift | Image Distance |
|---|---|---|---|---|
| 1 | 118.900 | 1.000 | 0.035 | 9.968 |
| 2 | 19.070 | 33.250 | −0.030 | 9.973 |
| 3 | 52.300 | 17.370 | 0.000 | 9.984 |

SYSTEM FIRST ORDER PROPERTIES, POS 1

FIELD: 29.0°    f/ 2.80
STOP: 0.00 after surface 8.    DIA: 30.181
EFL: 21.1981    FVD: 408.325    ENP: 47.9881
BFL: 9.96847    BRL: 398.357    EXP: −50360.1

SYSTEM FIRST ORDER PROPERTIES, POS 2

FIELD: 16.3°    f/ 2.80
STOP: 0.00 after surface 8.    DIA: 30.583
EFL: 41.1379    FVD: 340.750    ENP: 35.7107
BFL: 9.97308    BRL: 330.777    EXP: −50392.4

SYSTEM FIRST ORDER PROPERTIES, POS 3

FIELD: 21.0°    f/ 2.80
STOP: 0.00 after surface 8.    DIA: 30.338
EFL: 31.3286    FVD: 358.110    ENP: 41.7485
BFL: 9.98367    BRL: 348.127    EXP: −50376.5

First Order Properties of Elements

| Element Number | Surface Numbers | | Power | f' |
|---|---|---|---|---|
| 1 | 1 | 2 | −0.12733E−01 | −78.538 |
| 2 | 3 | 4 | −0.13385E−01 | −74.711 |
| 3 | 5 | 6 | 0.28742E−01 | 34.793 |
| 4 | 6 | 7 | −0.23778E−01 | −42.055 |
| 5 | 9 | 10 | 0.12529E−02 | 798.15 |
| 6 | 11 | 12 | 0.55572E−02 | 179.95 |
| 7 | 13 | 14 | −0.10899E−01 | −91.751 |
| 8 | 14 | 15 | 0.55776E−02 | 179.29 |
| 9 | 16 | 17 | 0.14218E−01 | 70.335 |
| 10 | 18 | 19 | −0.70362E−03 | −1421.2 |

First-Order Properties of Doublets

| Element Numbers | | Surface Numbers | | Power | f' |
|---|---|---|---|---|---|
| 3 | 4 | 5 | 7 | 0.80462E−02 | 124.28 |
| 7 | 8 | 13 | 15 | −0.50742E−02 | −197.07 |

First Order Properties of Groups

| Group Number | Surface Numbers | | Power | f' |
|---|---|---|---|---|
| 1 | 1 | 7 | −0.19268E−01 | −51.900 |
| 2 | 8 | 19 | 0.11887E−01 | 84.122 |

TABLE 4-continued

First Order Properties of the Lens

| Zoom Position Number | Power | f' |
|---|---|---|
| 1 | 0.47174E−01 | 21.198 |
| 2 | 0.24308E−01 | 41.138 |
| 3 | 0.31920E−01 | 31.329 |

TABLE 5

| Example | U1 | L1 | L2 | L3 | U2 | U2$_{S1}$ | U2$_{S2}$ |
|---|---|---|---|---|---|---|---|
| 1 | S1–S9 | S1–S2 | S8–S9 | S7–S8 | S10–S21 | S10–S15 | S17–S21 |
| 2 | S1–S10 | S3–S4 | S9–S10 | S7–S8 | S11–S22 | S11–S16 | S18–S22 |
| 3 | S1–S7 | S1–S2 | S5–S6 | S6–S7 | S8–S20 | S8–S12 | S13–S20 |
| 4 | S1–S7 | S1–S2 | S5–S6 | S6–S7 | S8–S19 | S8–S12 | S13–S19 |

TABLE 6

| Example | U1 (mm$^{-1}$) | U2 (mm$^{-1}$) | U2$_{S1}$ (mm$^{-1}$) | U2$_{S2}$ (mm$^{-1}$) | D$_{S1S2}$ (mm) | f$_{min}$ (mm) | BFL (mm) | D$_{12}$ (mm) |
|---|---|---|---|---|---|---|---|---|
| 1 | −0.0124 | .0126 | .0068 | .0121 | 59.7 | 44.9 | 80.9 | 79.3 |
| 2 | −0.0125 | .0183 | .0071 | .0112 | 65.6 | 44.9 | 81.2 | 86.2 |
| 3 | −0.0207 | .0118 | .0074 | .0084 | 35.3 | 21.1 | 81.3 | 114.0 |
| 4 | −0.0193 | .0119 | .0067 | .0095 | 36.9 | 21.2 | 81.3 | 118.9 |

D$_{S1S2}$ is the space between the first and second subgroups of the rear group.
f$_{min}$ is the shortest focal length of the zoom lens.
BFL is the back focal length in air, at infinite screen distance and at the shortest focal length of the zoom range.
D$_{12}$ is the separation between the first and second zooming groups at the shortest focal length of the zoom range.

What is claimed is:

1. A projection lens for forming an image of an object, said lens having an aperture stop and a zoom range between a minimum effective focal length and a maximum effective focal length, said lens comprising in order from its image end to its object end:

(A) a first lens unit having a negative power and comprising a first lens element, which has at least one aspherical surface, and at least two other lens elements, one of which has a positive power and the other of which has a negative power, the dispersion of the positive lens element being greater than the dispersion of the negative lens element;

(B) a second lens unit separated from the first lens unit by an axial space, said second lens unit having a positive power and comprising a first lens subunit on the image side of the second lens unit and a second lens subunit on the object side of the second lens unit, wherein each of said subunits has a positive power, the power of the second lens subunit is greater than the power of the first lens subunit, and the lens' aperture stop is located within the first lens subunit or is closer to the first lens subunit than to either the first lens unit or the second lens subunit for the lens having its minimum effective focal length; and (C) zoom means for varying the lens' effective focal length over the zoom range by changing the axial space between the first and second lens units;

wherein:

$D_{12}/f_{min} > 1.0$, $D_{S1S2}/f_{min} > 1.0$, $D_{12}/D_{S1S2} > 1.0$, and $BFL/f_{min} > 1.0$, where:

(i) $f_{min}$ is the minimum effective focal length of the lens;
(ii) BFL is the back focal length of the lens in air for an object located at infinity along the long conjugate side of the projection lens and for the lens having its minimum effective focal length;
(iii) $D_{12}$ is the axial distance between the first and second lens units for the lens having its minimum effective focal length; and
(iv) $D_{S1S2}$ is the axial distance between the first and second subunits of the second lens unit.

2. The projection lens of claim 1 wherein the first lens element is composed of plastic.

3. The projection lens of claim 1 wherein the second and third lens elements are a cemented doublet.

4. The projection lens of claim 1 wherein the first lens subunit comprises a lens element having at least one aspherical surface.

5. The projection lens of claim 4 wherein the lens element of the first lens subunit which has at least one aspherical surface is composed of plastic.

6. The projection lens of claim 1 wherein the distortion of the projection lens over the zoom range is less than or equal to one percent.

7. The projection lens of claim 1 wherein the object is a pixelized panel and the lateral color blur of the lens over the zoom range is less than a pixel for wavelengths in the range from 465 nanometers to 608 nanometers.

8. The projection lens of claim 1 wherein (a) the object is a pixelized panel; (b) the panel has a characteristic spatial frequency in cycles/millimeter which is equal to one over twice the pixel size in millimeters; and (c) the modulation transfer function of the lens at said characteristic spatial frequency changes by less than about twenty-five percent as the lens is heated from room temperature to its operating temperature.

9. A projection lens system for forming an image of an object, said system comprising:
   (a) an illumination system comprising a light source and illumination optics which forms an image of the light source;
   (b) a pixelized panel which comprises the object; and
   (c) the projection lens of claim 1.

* * * * *